Sept. 3, 1935.  R. E. J. NORDQUIST  2,012,971
VACUUM CLOSING MACHINE
Filed March 25, 1929  10 Sheets-Sheet 7

INVENTOR
Ronald E. J. Nordquist
BY John C. Carpenter
ATTORNEY

Sept. 3, 1935.  R. E. J. NORDQUIST  2,012,971
VACUUM CLOSING MACHINE
Filed March 25, 1929  10 Sheets-Sheet 8

INVENTOR
Ronald E. J. Nordquist
BY John C. Carpenter
ATTORNEY

Sept. 3, 1935.  R. E. J. NORDQUIST  2,012,971
VACUUM CLOSING MACHINE
Filed March 25, 1929   10 Sheets-Sheet 9

INVENTOR
Ronald E. J. Nordquist
John C. Carpenter
ATTORNEY

Patented Sept. 3, 1935

2,012,971

UNITED STATES PATENT OFFICE 2,012,971

VACUUM CLOSING MACHINE

Ronald E. J. Nordquist, Maplewood, N. J., assignor to American Can Company, New York, N. Y., a corporation of New Jersey Application March 25, 1929, Serial No. 349,855

23 Claims. (Cl. 113—1)

This invention relates to an apparatus for sealing or closing containers under vacuum, the containers and container covers being rapidly conveyed into a vacuum chamber and presented to a sealing mechanism positioned therein where they are hermetically sealed after which the sealed containers are removed from the chamber, all operations being performed without materially disturbing the vacuum within the chamber.

An important object of the present invention is the provision of an apparatus in which vacuum may be maintained in the sealing chamber at a predetermined point even when the air is or may be substantially or fully exhausted from the container and so that all containers may be sealed under substantially constant vacuum.

An important object of the invention is the provision of an apparatus in which the sealing of the container is prevented when the proper predetermined vacuum does not exist.

Another important object of the invention is the provision of a valve for conveying containers into and out of a vacuum chamber so mounted as to be readily removable from operating position without disturbing the setting of any of the timed elements connected therewith, the removed position of the valve permitting access to the interior of the valve and to adjacent parts of the vacuum chamber.

A further important object of the invention is the provision of an improved cooling system for a sealing or seaming head mechanism, comprising parts operating at high speed, and confined entirely within a vacuum chamber, such cooling system contemplating water circulation for and through certain of the stationary parts and expansion of air within a highly rarefied atmosphere with its resulting refrigerating characteristics for certain of the high velocity moving parts.

An important object of the invention is the provision of a seaming mechanism and a valve which introduces a can with a loosely applied cover into a vacuum chamber, and a guideway leading from the valve to the seaming mechanism, both valve and guideway regulating proper partial separation of the can and cover during their introduction into the chamber to insure withdrawal of the air from the interior of the can prior to the sealing of the cover thereto.

An important object of the invention is the provision of a casing built up in sections, a minimum number of certain sections carrying some of the working parts of the apparatus whereby the assembling of the sections with each other and with the remaining parts of the apparatus is greatly facilitated and whereby an air tight vacuum chamber is provided having a minimum number of openings in the casing wall and a minimum number of operating elements projecting through the casing and into an outside atmosphere, this construction insuring a chamber capable of maintaining an extremely high degree of vacuum.

Numerous other objects and advantages of the invention will be apparent as it is better understood from the following description, which, taken in connection with the accompanying drawings discloses a preferred embodiment thereof.

Referring to the drawings.

The present invention contemplates the use of an apparatus comprising a standard form of sealing mechanism herein illustrated as a double seaming mechanism that is adapted for closing containers or cans that are filled in normal atmospheric conditions and closing the cans within a vacuum chamber surrounding the sealing mechanism the chamber being under other than normal atmospheric conditions. Cans with loosely applied covers (illustrated as being clinched about the upper flange of the can) are received within the machine in untimed relation and the cans are then timed with conveying mechanism which presents the cans successively to the pockets of a rotary valve member.

The valve transfers each can to an opening communicating with the vacuum chamber and the can is then moved into a pocket of an intermittently moving turret. This turret carries the can to the seaming station where can and cover after being clamped within a seaming head are double seamed or otherwise united by a usual form of seaming mechanism. This seaming operation takes place while the can still remains in the pocket of the turret the latter being on its rest period at such a time. Following the sealing of the cover to the can the seamed can is then returned to a pocket of the valve and further moved to discharge mechanism.

The chamber into which the can is introduced is connected with vacuum control devices which regulate the amount of vacuum, a device operating to stop the machine in the event that the vacuum falls below a certain predetermined point. Parts of the seaming head are continuously moving and the frictional heat generated thereby is dissipated by a water cooling system. A rotating seaming head which carries seaming rollers and associated mechanism is further cooled by atmospheric air introduced into the vacuum chamber. Owing to the high degree of vacuum within the chamber this relatively small amount of atmospheric air upon being released within the chamber is rapidly expanded this resulting in efficient refrigeration of the atmosphere adjacent the rotating seaming head.

The working and supporting parts of the apparatus are carried by a base 21 (Figs. 1 and 3) a lower gear housing 22 being superimposed upon the base. A housing cover 23 is bolted to and rests upon housing 22 and in turn sustains a seaming casing 24 bolted to the housing cover 23. Seaming casing 24 in turn carries a casing cover 25 the parts 23, 24 and 25 enclosing a vacuum chamber 26 in which is located the principal parts of the seaming mechanism.

Figure 2:
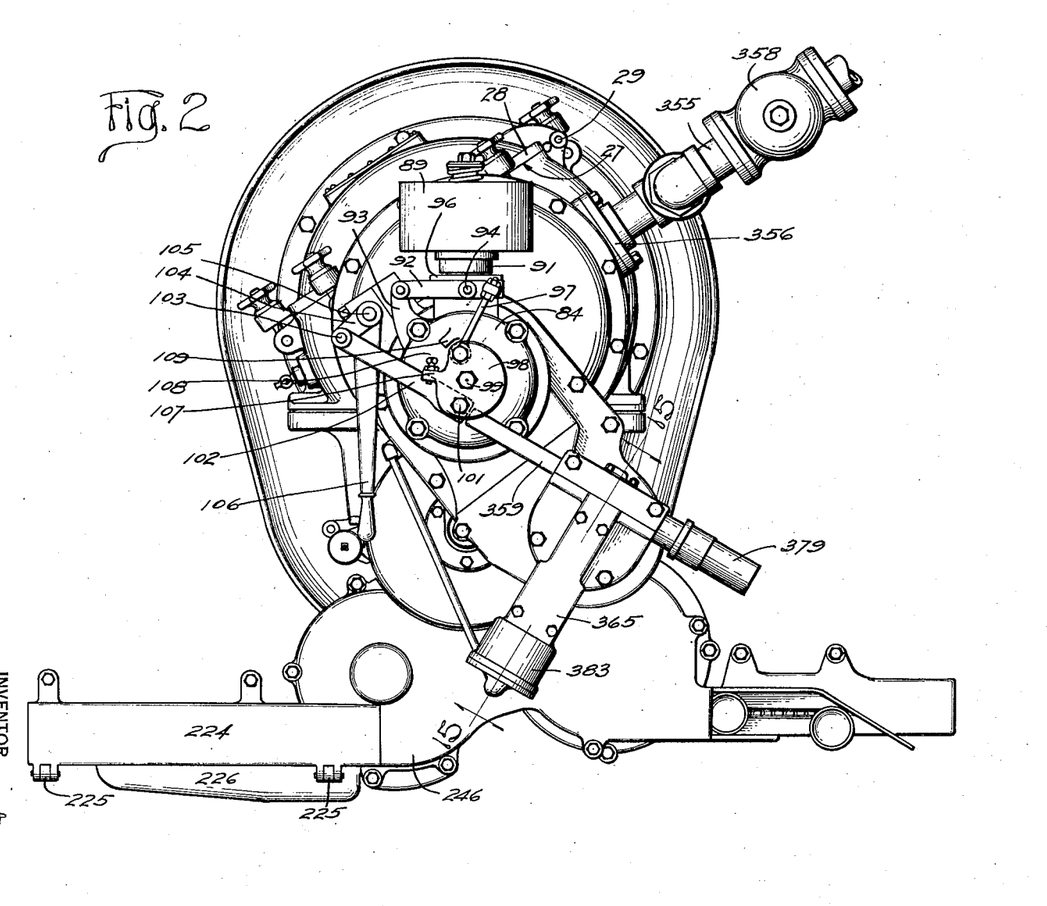
Fig. 2 is a plan view of the machine.

Casing 24 is provided with an opening 27 which is closed by a door 28 hinged at 29 to the casing 24, see also Fig. 2. Door 28 is held in sealed position against a flange of casing 24 by means of hand clamps 31 threaded about hinge latches 32 pivoted to lugs 33 projected from the casing 24. There are four hinge latches 32, each latch being movable within a slot 34 formed in the edge of door 28. A handle 35 carried by door 28 permits opening and closing of the same. With latches 32 moved into their respective slots 34 and hand clamps 31 threaded into locked position a packing 36 carried in a groove formed in the flange of the door 28 is tightly forced against the flange surrounding opening 27 of casing 24 and forms a hermetic closure for the vacuum chamber 26. A glass window 37 is inserted in door 28 and permits visual inspection of the can being closed in the double seaming mechanism.

The seaming mechanism includes a seaming head designated generally by the numeral 38 positioned entirely within the vacuum chamber 26. Also positioned within the vacuum chamber 26 and beneath head 38 is a can turret 39 which moves a can onto can lifting and positioning devices designated generally by the numeral 40.

Figures 12, 13, 14:
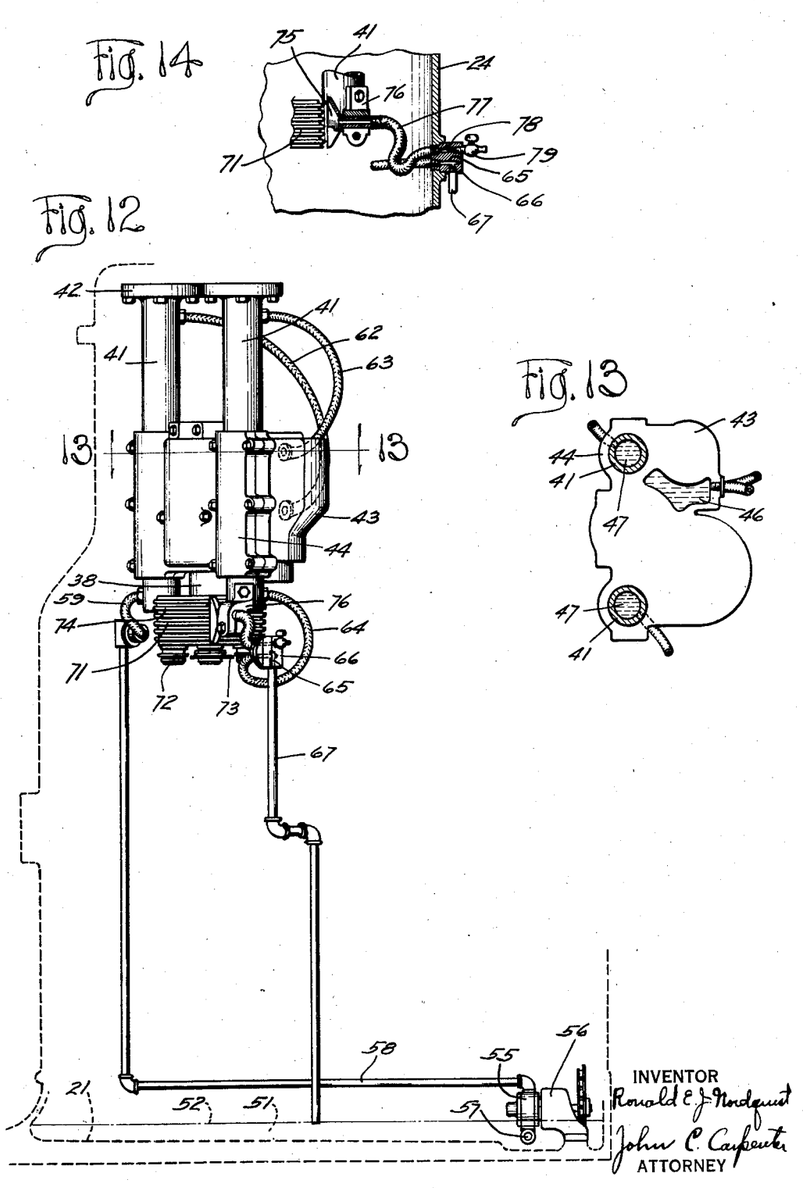
Fig. 12 is a skeleton view of those parts directly associated with the water and air cooling systems.
Fig. 13 is a skeleton view of the seaming head illustrating parts located along the line 13—13 in Fig. 12.
Fig. 14 is a fragmentary diagrammatic view illustrating parts of the air cooling system.

Stationary parts of head 38 are mounted upon and carried by columns 41 (Figs. 3 and 12) bolted at 42 to the casing cover 25. All of the seaming head mechanism is thus suspended from casing cover 25. Seaming head 38 comprises a seaming head housing 43 directly engaging the columns 41 and clamped thereon in a predetermined vertical position by cooperation with column caps 44. Housing 43 is adjusted up and down along the columns 41 by a connecting screw 45 having right and left hand threads which connect the housing 43 and the cover 25.

Housing 43 is provided with a chamber 46 (Fig. 13) through which is circulated a cooling fluid, circulation also being had within chambers 47 on the inside of columns 41. This cooling mechanism preferably comprises a water circulating system illustrated in detail in Fig. 12. A reservoir 51 is formed in the base 21 and contains a given amount of water 52 introduced into the reservoir through a filling neck 53 closed by a hinge cap 54 (see also Figs. 1, 3 and 9).

A rotary pump 55 (Fig. 12) is mounted within the reservoir 51 on a bracket 56 carried by the base 21 and the intake 57 of the pump extends below the level of the water 52. The other or outlet side of pump 55 is connected by a pipe 58 to a flexible hose 59 in turn connected to the lower end of one of the columns 41. The flexible hose 59 provides communication with chamber 47 of the one column 41 and a hose 62 connects the upper end of this chamber 47 in this column with the upper part of chamber 46 in housing 43. A second flexible hose 63 connects the lower part of the chamber 46 with the upper end of the chamber 47 enclosed in the second column 41.

Figure 1:
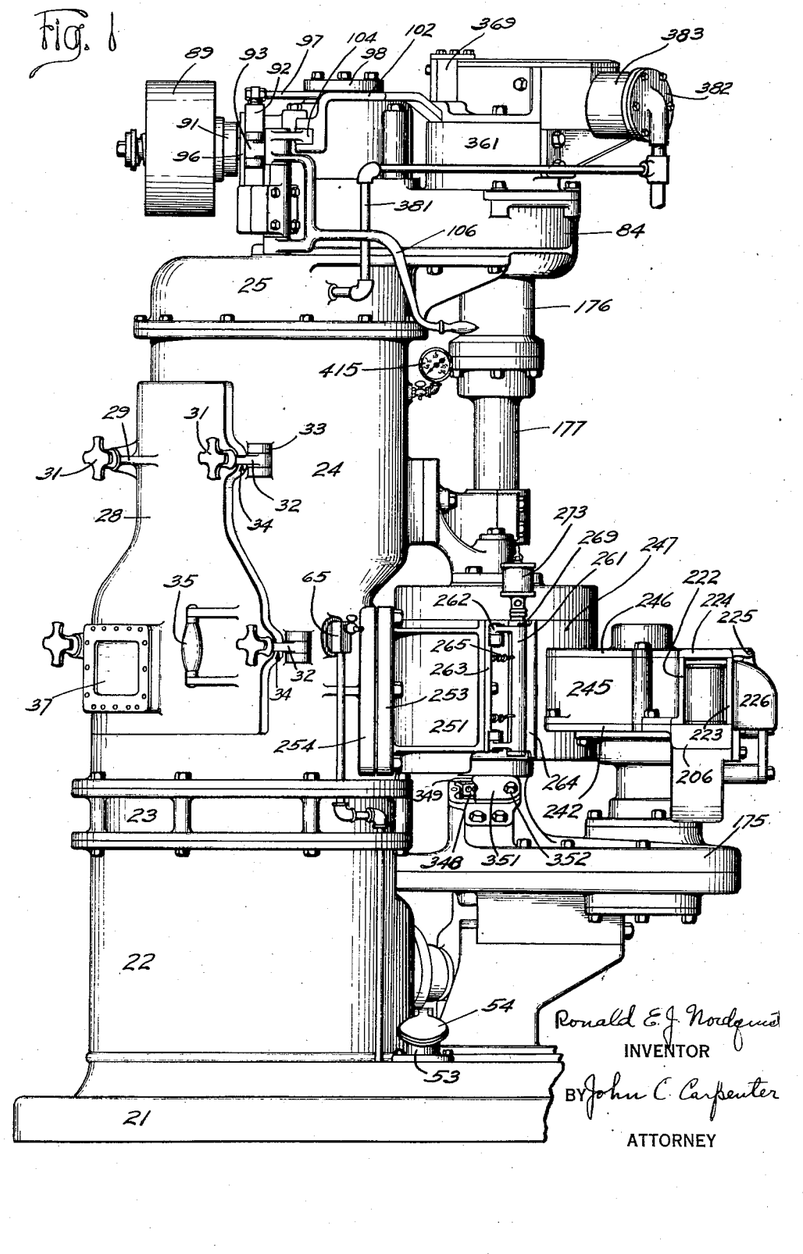
Figure 1 is a front elevation of the vacuum closing machine.

A flexible hose 64 secured to the lower end of the second column 41 provides communication between the lower end of its chamber 47 and a passageway 65 formed in a valve block 66 threadedly secured within a wall of casing 24 (Fig. 1). This passageway connects with a pipe 67 extending downwardly into the reservoir 51, the bottom end of pipe 67 being at the normal water level of the liquid 52. Heat generated by the moving parts of the seaming head 38 is carried by conduction through the walls of chambers 46 and 47 and passes into the water 52 which is circulated through the described connections by the pump 55.

A rotating member 71 of the seaming head 38 (Fig. 3), may be of usual or preferred type wherein seaming rollers 72 carried thereby are carried about a chuck 73. This rotating member 71 is preferably formed with projecting fins or annular ridges 74 which increase the outer surface of the same and permit increased cooling action of air introduced into the chamber adjacent the periphery thereof.

The air cooling device referred to comprises a nozzle 75 (Figs. 3, 12 and 14) carried by a bracket 76 bolted to the lower end of one of the columns 41. Nozzle 75 is adjacent to the periphery of head member 71 and communicates by means of a flexible hose 77 with the valve block 66, the interior of the hose 77 communicating with a passageway 78 therein controlled by a pet cock 79. Upon opening of the pet cock 79 air from outside the vacuum chamber rushes through the passageway 78, the hose 77 and nozzle 75 to the inside of the chamber where it expands rapidly causing refrigeration within the vicinity immediately surrounding the periphery of the revolving head 71. This expanded air absorbs heat from the revolving head with a resulting cooling of the same.

Seaming head 38 is controlled in a usual manner by connection with a vertical shaft 81 (Fig. 3) extending upwardly through the casing cover 25. A stuffing box 82 surrounds shaft 81 adjacent the place where it extends outside of the cover 25 and prevents leakage of air between shaft and cover. At the same time shaft 81 can freely rotate within a bearing 83 formed in an upper gear housing 84 mounted upon the cover 25.

Shaft 81 at its upper end carries a bevel gear 85 which meshes with a similar gear 86 secured to a horizontal drive shaft 87. Shaft 87 is journalled in bearings 88 formed in housing 84 and has a drive pulley 89 loosely mounted thereon. Power from a source outside of the machine is communicated to the pulley 89 in any usual manner to cause rotation thereof, this constituting a driving element of the machine. Any standard form of clutch 91 is interposed between the pulley 89 and the drive shaft 87 and when in clutched position connects these parts and thus causes rotation of the shaft 87 with the rotation of the pulley 89.

Clutch 91 (Figs. 1, 2 and 3) is thrown into clutched or unclutched position by movement of a yoke lever 92 pivoted on an arm 93 projected from gear housing 84. Lever 92 carries trunnions 94 pivotally connecting with a collar 95 operating over one of the bearings 88 and moving against a plate 96 associated with the clutch 91. In one position of the collar 95 the clutch 91 connects the pulley 89 and shaft 87 as aforesaid and in a second position the clutch disconnects these parts.

Lever 92 is shifted to cause movement of collar 95 by movement of a connecting rod 97 pivotally connected at one end with the lever 92 and at its opposite end with an oscillating disk 98 mounted to turn about a stud 99 carried by the upper part of housing 84. Disk 98 is pivotally connected at 101 to a bar 102 in turn pivotally connected at 103 to an arm 104 carried by a rock shaft 105 oscillated by a control handle 106. Operation of handle 106 thus actuates the clutch to connect or disconnect the driven and driving parts of the machine. Disk 98 carries a lug 107 in which is adjustably secured a stop bolt 108 adapted to strike against a lug 109 when disk 98 is in one position.

All movements of the driving mechanisms for operating the various units in the apparatus are derived directly or indirectly by connection with the drive shaft 87. The seaming head 38 through its connecting gears 85 and 86 just described is one example. Movement for the can turret 39 and the can lifting and positioning devices 40 located in vacuum chamber 26 is derived from drive shaft 87 through a series of connections which extend in large measure outside of chamber 26. A description of the individual units relating to actuation of the parts 39 and 40 will now be given.

Figure 19:
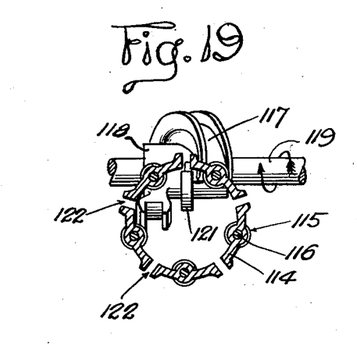
Fig. 19 is a sectional plan view taken substantially along the line 19—19 in Fig. 9.

Turret 39 (Figs. 3 and 4) is provided with a plurality of can receiving pockets 111 and is bolted to the upper end of a vertical shaft 112 rotating within a tubular bearing 113 formed in housing cover 23. A form of Geneva transmission, in part carried by shaft 112 operates to impart step movement to the shaft, the part of the transmission so carried comprising a disk 114 keyed to and held upon the lower end of shaft 112 (see also Figs. 5, 9 and 19). Disk 114 carries a series of spaced rollers 115 loosely mounted upon pins 116. A roller 115 is engaged within a cam groove 117 of an irregular shaped cam 118 secured to a horizontal shaft 119.

The shape of cam groove 117 is such as to impart a partial rotation to the disk 114 which is followed by a rest period, both movement and rest taking place with each complete rotation of the cam member 118. For this purpose the cam groove 117 extends around more than half of the perimeter of the cam 118. Throughout contact between the inclined sections of the cam groove 117 and a roller 115 movement of the disk 114 takes place, then follows a rest period as the end of the cam groove leads the roller, and throughout the remaining cycle of rotation of cam 118, disk 114 is held stationary by a locking ring segment 121 carried by the cam 118. This segment engages within one of a series of grooves 122 formed in the bottom face of disk 114. Can turret 39 is thus moved in accordance with disk 114 and shaft 112 for the purpose of presenting cans to the seaming head as hereinafter set forth.

Shaft 119 (Figs. 3, 5 and 9) is journalled within a bearing 125 carried by a depending bracket 126 formed integrally with the housing cover 23 and in a bearing 127 carried by a bracket 128 also formed integrally with the housing cover 23. The end of shaft 119 adjacent the cam 118 and bearings 125 and 127 is positioned within an oil chamber 129 formed by the lower gear housing 22 and the housing cover 23. Oil chamber 129 is thus positioned directly beneath the vacuum chamber 26 and is separated therefrom by the upper surface of the housing cover 23.

Chamber 129 is adapted to contain lubricating oil 131 in which the can turret driving parts and other mechanism operate. The upper level of the oil extends to a point just beneath the upper edge of the gear housing 22 providing a head space 132 above the oil which is connected with the upper part of the vacuum chamber 26 by a vertically positioned pipe 133 carried within a boss 134 formed in the upper surface of the cover member 23.

This pipe construction insures the same atmospheric conditions within the chambers 129 and 26, these being normally under a substantial vacuum or rarefied atmosphere. Such an equalization of pressures within the two chambers 26 and 129 prevents raising of the oil 131 around and about shaft 112 and other parts of the mechanism and its passage into the vacuum chamber.

The housing cover also carries mechanism of the can lifting and positioning devices 40. These devices comprise a lifting plunger 142 positioned within the vacuum chamber and held within a sleeve 143 moving up and down in a bearing 144 formed integrally with the housing cover 23. The plunger may be yieldingly connected with the sleeve as by a spring connection, not shown, this being a usual construction in plungers of this type. Plunger 142 is directly beneath and in axial alignment with chuck 73 of the seaming mechanism its sleeve 143 extending through the cover 23 and into the head space 132 of the oil chamber 129. At its lower end sleeve 143 carries a cam roller 147 which rests upon a ring cam 148 carried by a flange 149 of a cam member 151 keyed to a vertical shaft 152 journalled in a bearing 153 formed in the upper wall of housing cover 23 and within a bearing 154 carried by the bracket 128.

Continual rotation of shaft 152 within its bearings 153 and 154 carries cam ring 148 beneath roller 147 and this action by reason of the varying thickness of cam ring 148 raises and lowers sleeve 143 and plunger 142. Cam member 151 also carries a cam flange 155 spaced from ring cam 148 which is engaged by a cam roller 156 mounted on the same axis as roller 147 and carried by the sleeve 143.

Cam flange 155 cooperating with ring cam 148 thus holds roller 147 against its cam surface and causes sleeve 143 and plunger 142 to follow the ring cam 148. Shaft 152 receives continual rotation from shaft 119 by a gear connection comprising bevel gears 157 and 158 carried by the respective shafts 152 and 119.

Shaft 119 (Figs. 5 and 9) projects through one wall of the housing 22, a stuffing box 161 being mounted on shaft 119 where it passes from the chamber 129. This permits rotation of the shaft 119 and prevents passage of air into the said chamber.

The outer end of shaft 119 exterior of the chamber 129 is carried in bearings 162 formed in a housing 163 mounted on base 21. Shaft 119 (Figs. 8 and 9) carries a sprocket 164 over which operates a chain 165 also passing over a sprocket 166 mounted on a shaft 167 connected with the rotor member of the water pump 55. Rotation of the shaft 119 is by this means transmitted to the pump 55 for the circulation of the cooling water within the seaming head mechanism as previously described. Sprocket 164 and chain 165 are positioned within a housing 168 mounted upon base 21.

Shaft 119 (Figs. 3, 5, 8 and 9) carries within the housing 163, a bevel gear 171 which meshes with a similar gear 172 keyed to the lower end of a vertical shaft 173. Shaft 173 at its lower end rotates within bearings 174 formed in a valve frame 175 carried upon housing 163. The upper end of shaft 173 rotates within a bearing 176 formed in the upper gear housing 84. Bearing 176 is further reinforced by a sleeve 177 bolted thereto and extending downwardly around shaft 173 this construction holding shaft 173 more rigid.

The upper end of shaft 173 positioned within the housing 84 carries a spur gear 181 (Figs. 3 and 5) normally connected therewith by a slip clutch device hereinafter fully explained, and said gear 181 meshes with an idler gear 182 rotating about a stud 183 secured within a boss 184 formed in the housing 84. Gear 182 in turn meshes with an idler gear 185 rotating about a stud 186 secured within bearings 187 formed in the housing 84. Gear 185 is formed integrally with a gear 188 which in turn meshes with a gear 189 formed integrally with the gear 85 carried by shaft 81.

Through the described connection it will be evident that drive shaft 87 furnishes a driving power for not only the entire seaming mechanism, positioned within the upper part of chamber 26 but also the mechanism contained within oil chamber 129 and the lower part of chamber 26, this latter mechanism relating to the can turret 39 and the can lifting and positioning devices 40. It should also be observed that a large part of this driving connection is exterior to chambers 26 and 129 and that connection with the mechanism within the chambers is made at two places only, that is by shaft 81 surrounded with its stuffing box 82 and by shaft 119 surrounded by its stuffing box 161. This construction permits easy assembly of the parts, affords driving connections exterior of the chambers for certain can feeding devices to be hereinafter described, and furthermore provides a more efficient vacuum chamber with minimum possibilities for leaks.

Figure 15:
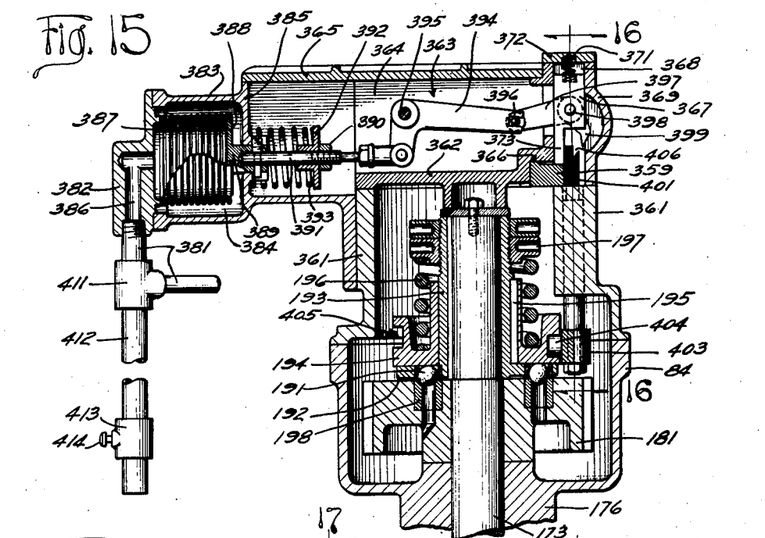
Fig. 15 is a transverse sectional view of the upper part of the machine, the view being taken substantially along line 15—15 in Fig. 2.

The slip clutch connected with gear 181 is illustrated in Fig. 15 and comprises a series of balls 191 retained within an outwardly extending flange 192 of a sleeve 193 keyed to and held on the upper end of shaft 173. The balls 191 are confined between gear 181 and a sliding collar 194 surrounding the sleeve 193, being slidable along a feather 195 secured to the sleeve 193. This connection permits sliding movement between collar and sleeve, preventing relative rotation therebetween. A coil spring 196 surrounds the stem of collar 194 and is interposed between a part thereof and threaded washers 197 adjustably secured to the upper end of sleeve 193. By this means the balls 191 are normally forced downwardly and normally each ball is seated within a depression formed in the upper end of a bushing 198 inserted within the gear 181.

As long as balls 191 are engaged within their respective bushings 198 the gear 181 is locked with the sleeve 193 which in turn is keyed to the shaft 173. In case of a jam or excess strain on the driven parts, which would result in locking the shaft 173 against rotation, spring 196 yields sufficiently to permit slight sliding movement of the collar 194 as the balls 191 ride out of their seats within the bushings 198. Each bushing 198 is positioned at a different distance from the center of the shaft 173 and this insures proper timing by requiring a complete revolution of the gear 181 about shaft 173 before the balls are again in locking position.

Cans 200 with loosely applied covers 201 are introduced into and are removed from chamber 26 through an opening 202 (Figs. 3 and 4) formed in casing 24 opposite the opening 27. The introduction of the cans within the chamber 26 and their removal therefrom takes place without any appreciable impairment of the vacuum existing therein. This is made possible by the use of a valve member cooperating with a can conveying mechanism which will now be described.

The various mechanisms used, in moving cans from the position where they first enter the machine to the position where they leave the machine, comprise a feeding device for first bringing cans into the machine, a timing mechanism for individually timing and separating each can from the other cans, a transfer device for moving the timed cans from the timing mechanism, a valve member for receiving cans from the transfer device and positioning them into a pocket 111 of the can turret 39, the can turret 39, which intermittently advances the can and which presents it to the seaming mechanism and again returns it to a pocket of the valve member, and a discharge device for conveying the cans from the valve and out of the machine. The mechanisms of these various devices will now be described in the order here given.

Figure 3:
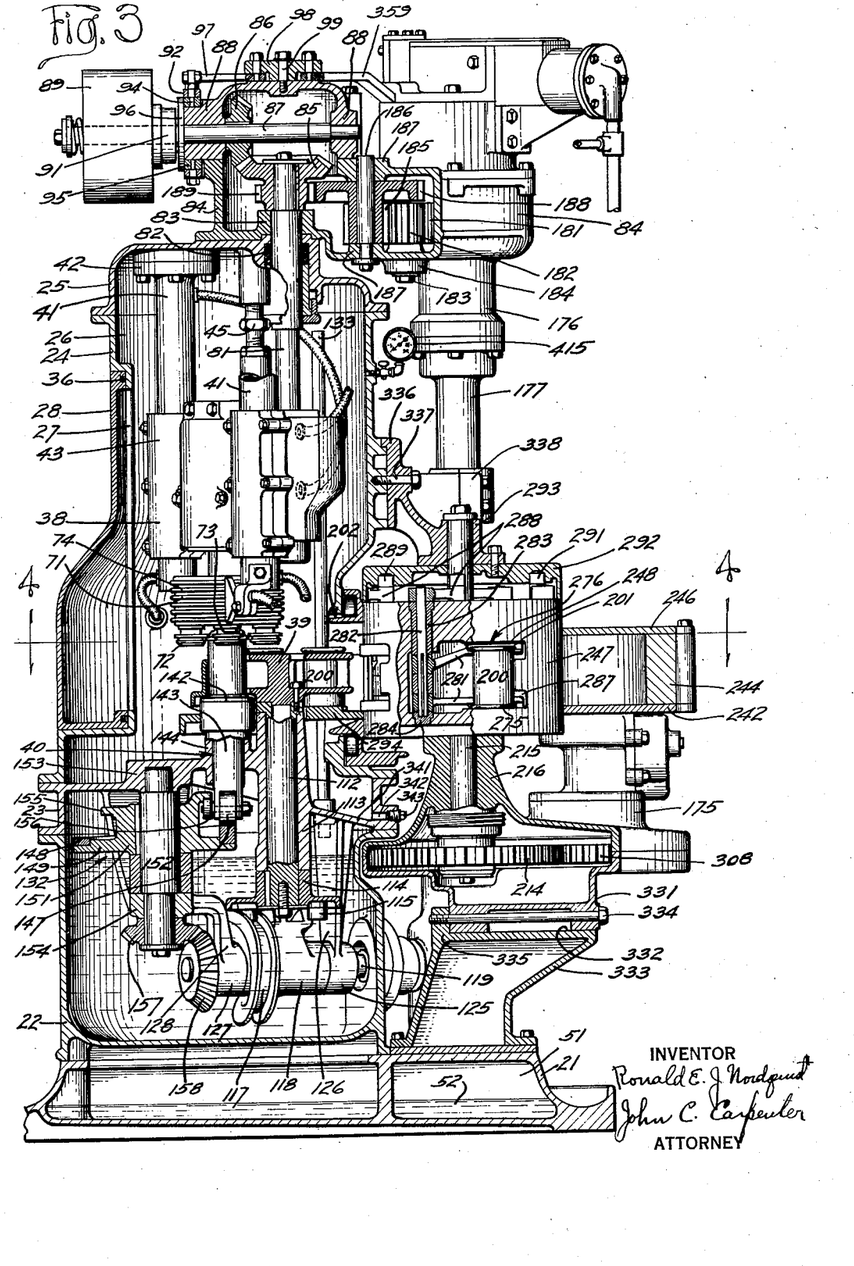
Fig. 3 is a longitudinal section of the machine, taken substantially along line 3—3 in Fig. 4, parts being broken away.
Figures 4, 5:
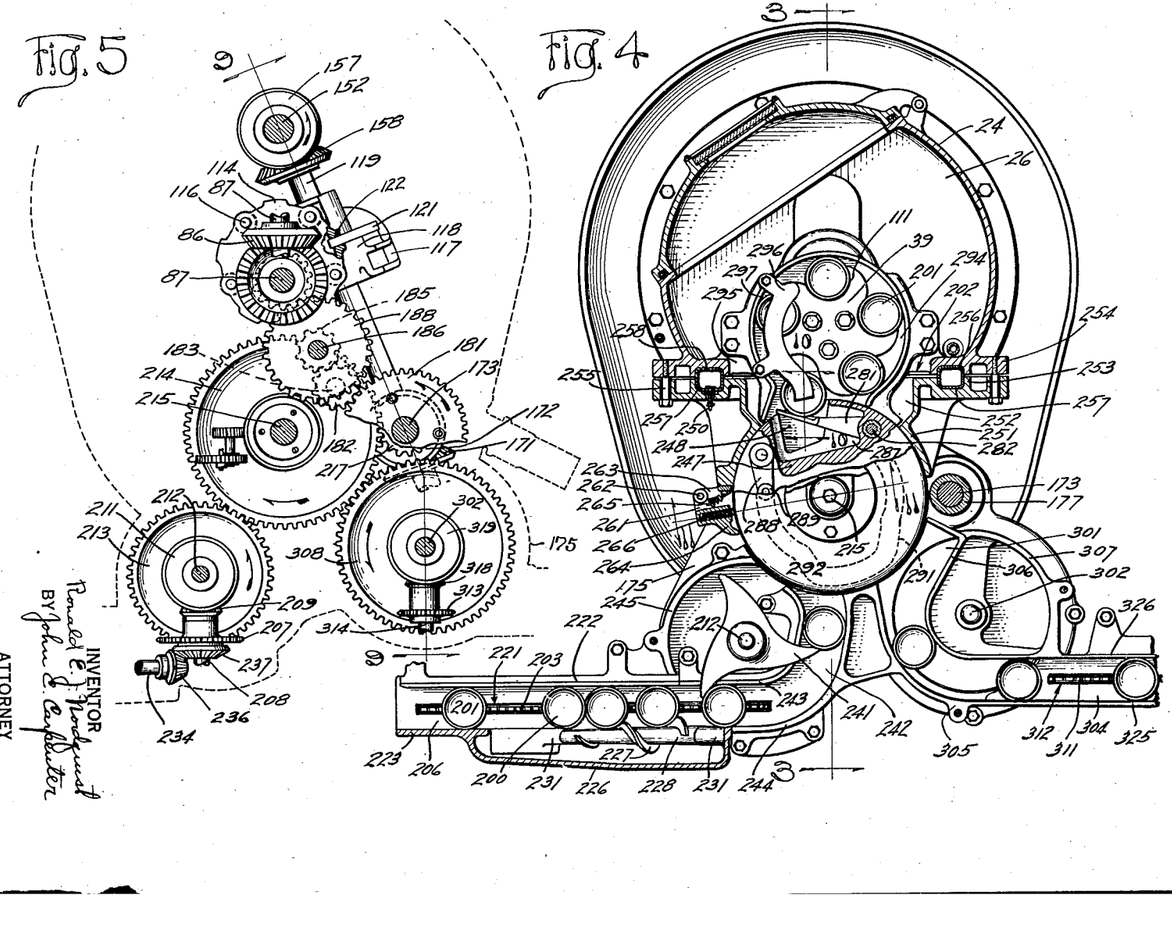
Fig. 4 is a plan sectional view taken substantially along the line 4—4 in Fig. 3, parts being removed and broken away.
Fig. 5 is a top plan view of the principal gearing in the machine, shafts being in section and the associated and interventing frame parts being removed and some gear parts being broken away.
Figure 8:
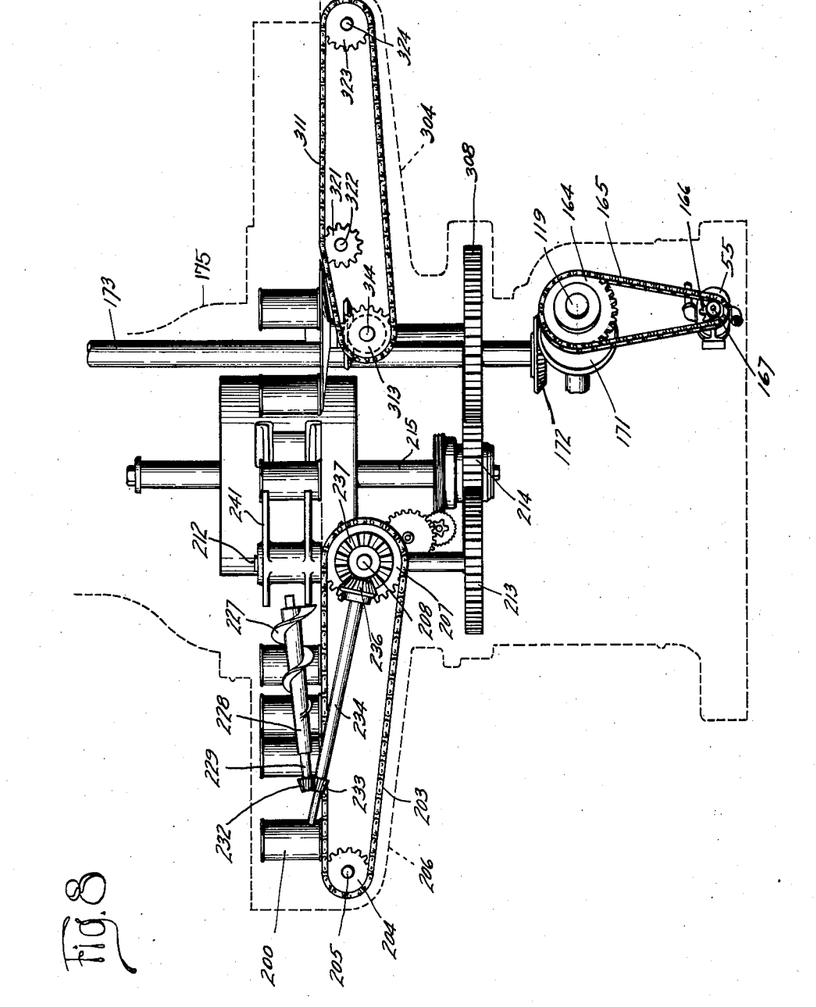
Fig. 8 is a diagrammatic front elevation of the can conveying devices and associated gearing, supporting frame parts being removed.
Figure 11:
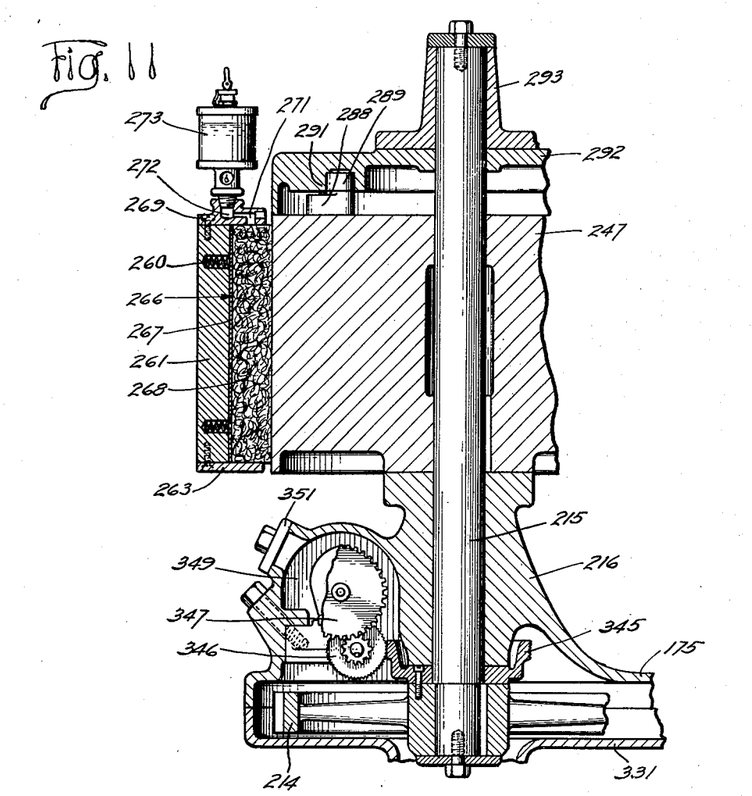
Fig. 11 is a transverse sectional view taken substantially along line 11—11 in Fig. 4.

All of the mechanisms just mentioned except can turret 39 are mounted upon and carried by the valve frame 175 (Figs. 4, 5 and 8). The cans with loosely applied covers are introduced into the machine by the feeding device, which comprises a continuously moving conveyor chain 203 passing over an idler sprocket 204 mounted on a shaft 205 journalled in a feed-in table 206 carried by the valve frame 175. The forward end of chain 203 passes over a sprocket 207 secured to a shaft 208 journalled in the table 206. Shaft 208 (Fig. 5) also carries a bevel pinion 209 which meshes with a bevel gear 211 secured to a vertical shaft 212 journalled in the table 206. Shaft 212 carries a gear 213 which meshes with a gear 214 secured to a valve shaft 215 (Figs. 3 and 11) journalled in a bearing 216 formed in valve frame 175. Gear 214 (Fig. 5) also meshes with a gear 217 secured to shaft 173, which shaft thus furnishes the driving energy for the conveyor chain 203.

The upper run of conveyor chain 203 passes along a slot 221 (Fig. 4) cut in the upper surface of table 206. The incoming cans 200 with their applied covers 201 are supported upon the conveyor 203 and moved over the upper surface of the table 206 in processional order. During this passage of the cans the same are guided between walls 222 and 223 mounted upon table 206. Walls 222 and 223 extend to a point above the can and are covered by a plate 224 (Figs. 1 and 2) hinged at 225 on wall 223 and on a housing 226 formed in the wall 223. This construction provides a tunnel for the incoming cans, the hinge plate 224 being easily removed to permit access to the tunnel and to the cans therein, the plate at such time being swung about its hinges.

The timing mechanism is located to one side of table 206 and comprises a spiral thread 227 (Figs. 4 and 8) formed on a sleeve 228 fixed to a shaft 229 rotating in bearings 231 formed in the housing 226. Thread 227 gradually and uniformly increases in size from its beginning where it coincides with the diameter of the sleeve 228, this being at the end first engaged by the incoming cans, up to its maximum diameter at the end of the sleeve. This thread engages each can successively, retards and separates the same, the conveyor chain 203 sliding beneath the cans as they move forward at a slower rate of travel. Thread 227 at its large end times the forward travel of the can in synchronism with the other operations of the machine.

Devices for rotating shaft 229, sleeve 228 and its thread 227 comprise a bevel gear 232 secured to shaft 229 and meshing with a similar gear 233 formed integrally with a shaft 234 journalled within the forward bearing 231 and within a bearing 235 (Fig. 7) bolted to the table 206. The opposite end of shaft 234 carries a bevel gear 236 (Figs. 5 and 8) which meshes with a gear 237 secured to shaft 208.

A can 200 reaching the forward end of the thread 227 is engaged by an arm of a star wheel 241 (Figs. 4 and 8) secured to the upper end of shaft 212, this constituting a can transfer device. Star wheel 241 slides the can over a surface 242, which is a continuation of the upper surface of table 206, during which time the can traverses a substantially circular path being moved between guide rails 243 and 244 carried by valve frame 175. The circular guide rails 243 and 244 are eccentrically positioned relative to the shaft 212 and the can passing therethrough is therefore accelerated. This acceleration properly spaces the cans for entry into the pockets of a rotating valve member.

Guide rail 244 extends above the top of the can and a circular wall 245 mounted upon the valve frame 175 and concentric with shaft 212 is of the same height. A cover plate 246 (Fig. 2) rests upon guide rail 244 and wall 245 and these parts completely enclose the star wheel 241 and the cans moving therewith.

The valve member (Figs. 3, 4 and 11) comprises a circular drum or valve 247 keyed to shaft 215, the same being supported, during its rotation, by the bearing 216. A can 200 received from star wheel 241 rests within a pocket 248 of the valve 247 and is thereby carried around a circular path of travel to the opening 202 of the vacuum chamber 26. During a part of the rotation of the valve 247 each chamber 248 is sealed against the outside atmosphere, this being accomplished by a member interposed between the valve and the casing 24.

This sealing member comprises a hollow float valve seat member 251 positioned in front of opening 202 and partially encircling the outside of the valve 247, an inner chamber 252 thereof communicating with the opening 202. Opening 252 adjacent chamber 26 is surrounded by a flange 253 cooperating with a flange 254 formed in the seaming casing 24. Float valve seat member 251 is movably held in position relative to casing 24 by studs 255 passing through openings formed in the flanges 253 and 254.

Flange 254 is provided with a groove 256 extending around the opening 202. A corresponding aligned groove 257 is formed in the flange 253, and a resilient or flexible tubular member 258 is positioned within said grooves. This tubular member provides a seal for the joint between the flanges 253 and 254 and at the same time holds the float valve seat member 251 in air-tight position against the face of the valve 247. The tubular member 258 is inflated through valve 250 and the pressure forces the float valve 251 against the valve seat member 247 and thereby provides air tight but movable contact between those members.

An oiling and scraping device (Figs. 1, 4 and 11) is provided to aid in an easy movement of the valve 247 within the seat of the float valve seat member 251. This comprises a plate 261 extending substantially the entire height of valve 247 and hinged at 262 to a bracket 263 bolted to the float valve seat member 251. Plate 261 is provided with a scraper blade 264 which normally rests against the outer periphery of the valve 247. This normal position is maintained by springs 265 interposed between the plate 261 and the bracket 263. Scraper blade 264 (Fig. 18) is used to remove any foreign material which might collect on the outer surface of the valve 247 so as to clean said surface. The close fit necessary at all times between valve and valve seat makes such a scraping device highly desirable.

Plate 261 is also provided with a channel 266 extending throughout its entire height and in this channel is positioned a follower strip 267 backed up by springs 260 recessed in the plate. A felt or other suitable type of wick 268 is confined within the slot 266 with its outer edge against the periphery of the valve 247 being pressed thereagainst by the springs 260 and plate 267.

An extension 269 of bracket 263 extends above the wick 268 and is provided with a channel 271 connecting with the upper surface of the slot 266 and the wick 268. This channel 271 communicates with a similar passage 272 which connects with an oil drip cup 273 mounted on the extension 269. Oil dropping from the cup 273 flows by gravity through the passageways 272 and 271 and is absorbed by the wick 268 which in turn applies a film of oil to the outer periphery of the valve 247 as it rotates. As illustrated in Fig. 4 this oiling device is positioned directly back of the scraper blade 264 and thus in position to apply oil to the cleaned surface of the valve which moves continually past scraper and oiler.

Figure 10:
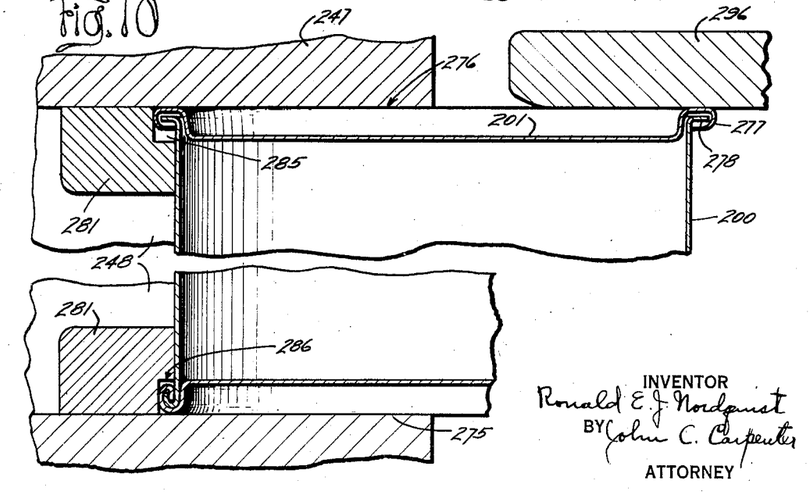
Fig. 10 is an enlarged fragmentary sectional view taken substantially along line 10—10 in Fig. 4.

The top of each pocket 248 (Figs. 3 and 10) is only a short distance above the can 200 positioned therein and the pocket's total height is therefore considerably less than the height of the valve 247. This provides a floor 275 for each pocket on which a can rests and also a ceiling 276 spaced a slight distance above the top of a can cover resting upon its can. As each pocket 248 during its movement with the rotating valve 247, connects with the opening 252 of the float valve seat member 251 (Fig. 4), air in the pocket surrounding the can quickly passes into the vacuum chamber 26 causing a reduction in air pressure within the pocket. Simultaneously, or perhaps immediately following, the air within the can which is also at atmospheric pressure, begins to escape and this causes a slight lifting of the can cover 201. This action of lifting of the cover is limited by the ceiling 276 of the turret pocket 248 and the cover cannot be raised beyond a predetermined position.

Where the can cover 201 is clinched onto the can 200, this being the form illustrated in the drawings, a curl 277 of the cover extends over a flange 278 of the can. The ceiling 276 of the turret pocket 248 in this case prevents the lifting of the cover 201 to a point where its curl 277 would lock against the can flange 278 for if such a locking action took place the escape of the air from the interior of the can would be retarded. It is desirable that this air be withdrawn from the interior of the can as rapidly as possible and necessary that the predetermined vacuum be established inside the can prior to its being clamped at the seaming station.

Discharge arms 281 (Figs. 3, 4 and 10) are positioned within each chamber 248 and are keyed to a vertical shaft 282 which oscillates within a bushing 283 and within a bearing 284 both carried by the valve 247. Two arms are illustrated in the drawings, there being an arm for engagement with the upper end of the can and an arm for lower engagement with the bottom end of the can. The upper arm 281 (Fig. 10) is provided with a slot 285 which permits contact with both the wall of the can 200 and with the cover 201 and the lower arm is provided with a similar slot 286 which permits contact with the wall of the can 200 and with the bottom seam of the same.

The arms 281 within a pocket 248 rest in their innermost position when a can 200 enters, they being confined within recesses 287 cut in the pocket wall, (Figs. 3, 4 and 5). Upon alignment of a pocket 248 with the opening 252 of the float valve seat member 251 the arms 281 are moved outwardly to project the can resting therein through the opening 252 and into a pocket 111 of the can turret 39. This movement of the arms 281 is cam controlled.

Each shaft 282 extends beyond its bushing 283 and carries an arm 288 (Figs. 3, 4 and 11) which in turn carries a cam roller 289 operating within a cam groove 291 formed in a valve cover 292 secured to an auxiliary valve frame 293 in which rotates the upper end of the shaft 215. Valve cover 292 being held against movement and valve 247 being rotated therebeneath, each cam roller 289 traverses the cam groove 291 which, by reason of its contour, shifts arm 288 and thereby oscillates the shaft 282 to move arms 281 as aforesaid.

Can 200 (Fig. 4) moving from the valve pocket 248 and passing through opening 252 of the valve and into the chamber 26 through its opening 202, enters into a pocket of turret 39 and moves onto and over a table 294 secured to lugs 295 projected from the inner wall of casing 24.

Cover 201 clinched upon the can 200, during this passage into chamber 26, remains in position permitting discharge of the air from the interior of the can, the raised cover resting against and moving along the underside of a guide rail 296 (Figs. 4 and 10) positioned above turret 39, the lower surface of which is in exact alignment with the ceiling 276 of the pocket 248. Rail 296 extends from the point of entrance of the can within the chamber 26 to the seaming station where the can is brought upon the plunger 142 of the can lifting and positioning mechanism 40. Rail 296 is secured to a circular guide wall 297 which practically encircles the can turret 39 and which is supported upon lugs 295 of the casing 24. Wall 297 guides each can 200 in its circular path of travel over the table 294 and holds the same within the turret 39.

Figures 16, 17, 18:
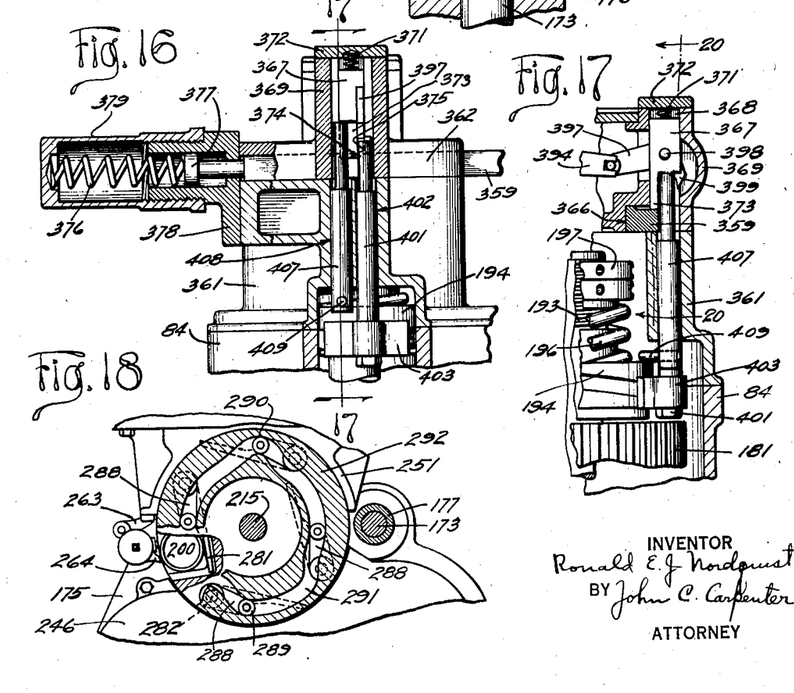
Fig. 16 is a transverse sectional view taken along line 16—16 in Fig. 15.
Fig. 17 is a sectional view, parts shown in elevation, taken along line 17—17 in Fig. 16.
Fig. 18 is a sectional plan view taken substantially along line 18—18 in Fig. 7.

The can intermittently moved by the can turret 39, is brought to rest at two idle stations, before being brought to rest upon plunger 142 (Fig. 3) at the seaming station. Following the seaming operation the seamed can is further intermittently advanced by the can turret 39 through two more idle stations and is finally moved into a pocket 248 of valve 247 this pocket having just been emptied of a can entering turret 39. During this reentrance of the seamed can into the valve pocket, arms 281 are held in retracted position, having been returned to this position by action of cam groove 291 operating on the roller 289 associated therewith. Fig. 18 illustrates this roller 289 at a high point 290 of groove 291, this action holding arms 281 extended. The incline in the cam groove 291 to the right of this high point 290 effects retraction of arm 281 as valve 247 moves pocket 248 into the can receiving position just described. Upon further movement of the valve 247, such cans are carried thereby to a position of discharge.

The discharge device comprises a disk 301 (Figs. 4 and 9) keyed to a vertical shaft 302 journalled in a bearing 303 formed in the valve frame 175 and in a table 304 carried by the valve frame 175. The can is again projected from its pocket 248 by outward movement of arms 281 and in so doing passes upon the rotating disk 301.

The can is carried by the rotating disk 301 in a circular path of travel being confined at such time between an outer wall 305 formed integrally with wall 244 carried by the table 304, and an inner wall 306 of a housing 307 mounted upon the table 304.

Figure 9:
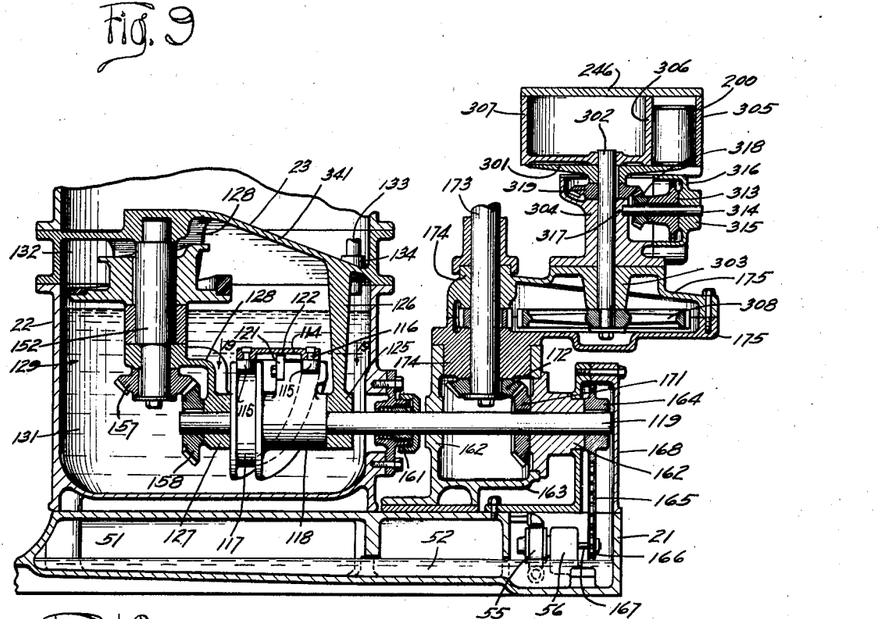
Fig. 9 is a longitudinal sectional view of the lower part of the machine the section being taken along a plane substantially indicated by the broken line 9—9 in Fig. 5.

Disk 301 is continually rotated by a connection illustrated in Figs. 5 and 9, comprising a spur gear 308 carried by the shaft 302 and meshing with the gear 214.

The can carried by disk 301 is then discharged onto the upper surface of table 304 and onto the upper run of a conveyor chain 311 (Figs. 4 and 8) operating in a slot 312 cut in the floor thereof. Conveyor chain 311 operates over a drive sprocket 313 keyed to a horizontal shaft 314 (see also Figs. 5 and 9) journalled in a bearing 315 formed in a gear housing 316 secured to the table 304 and in a bearing 317 formed in said table. Shaft 314 also carries a bevel pinion 318 which meshes with a bevel gear 319 keyed to shaft 302 and positioned directly beneath the disk 301.

Chain 311 also passes over an idler sprocket 321, rotating with a shaft 322 journalled in the table 304, and over an idler sprocket 323 rotating with a shaft 324 also journalled in the said table. Conveyor chain 311 thus carries the seamed can over table 304 and between guide walls 325 and 326 supported thereupon, the former being an extension of wall 305, the latter being an extension of wall 306.

Provision is made for swinging the entire valve frame 175 about the shaft 173 to move valve 247 from operating position. Inasmuch as all of the can conveying mechanism relating to feeding a can into the valve and removing it therefrom is mounted upon frame 175, this shifting of the said frame also moves these parts bodily. The open position of valve frame 175 is illustrated in Fig. 6, this position permitting inspection of the opening 252, the float valve seat member 251, the inner face of the valve 247 and any cans that may be therein at the time.

Frame 175 is connected with a lower supporting housing 331 (Figs. 3 and 7) which carries the weight of the frame and parts carried thereby. Housing 331 rests upon an upper horizontal surface 332 of a box frame 333 carried by the base 21. When the valve frame 175 and associated parts are moved outwardly to open position housing 331 slides along the surface 332, but does not pass therefrom.

The valve frame and associated parts are retained in closed position, the bottom part being held by a bolt 334 passing through the housing 331 and threadedly secured within a projection 335 formed on frame 333. The upper part of the valve mechanism is also bolted, frame 293 being provided with an extension arm 336 through which passes a bolt 337 threadedly secured within the casing 24. Arm 336 also extends laterally and embraces shaft 173 in a bearing 338 which is directly beneath the sleeve 177.

Figures 6, 7:
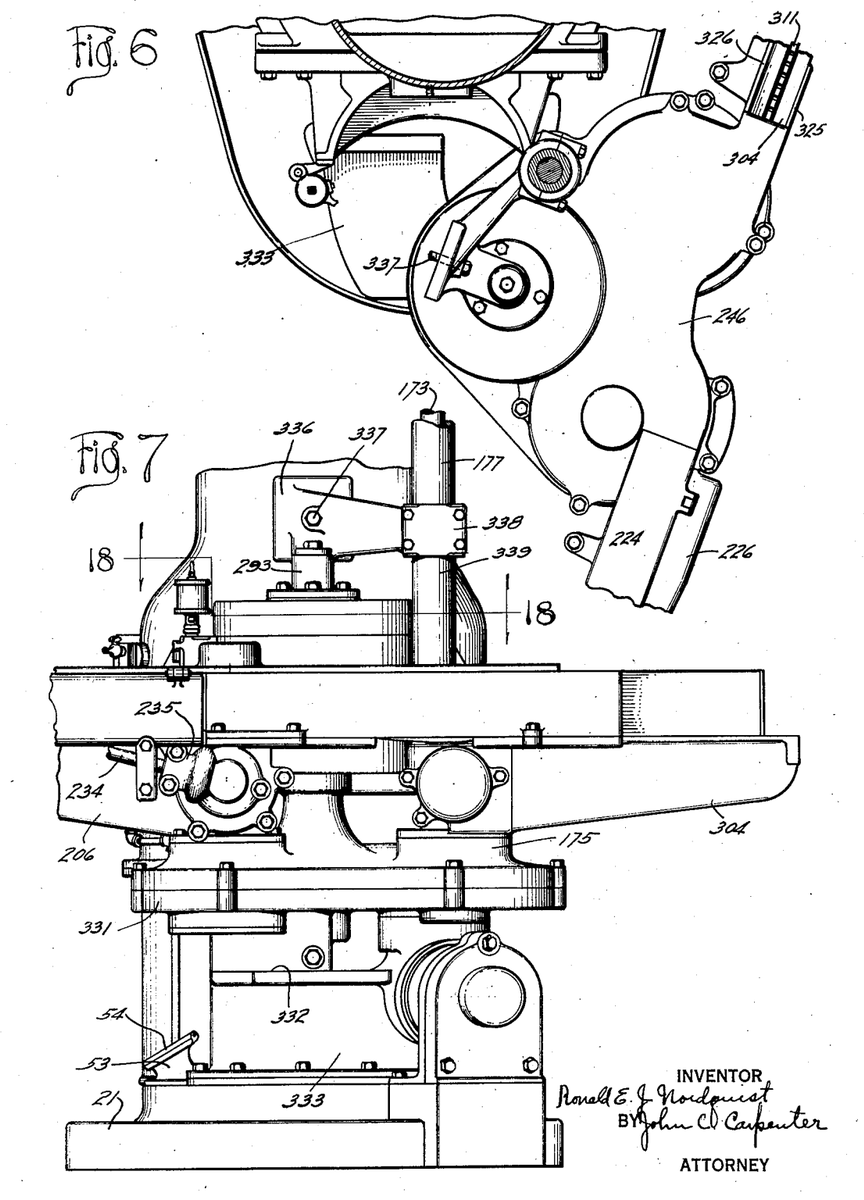
Fig. 6 is a fragmentary plan, sectional view of the valve and its supporting frame the latter being swung outwardly into non-operating position.
Fig. 7 is a front elevation of the lower part of the machine.

It will now be evident by referring to Figs. 3, 7 and 9, that the removal of bolts 334 and 337 will leave the frame 175 and all parts carried thereby free to be moved about the shaft 173, bearing 338 forming one pivotal connection with the shaft and bearing 174 of valve frame 175 moving within the housing 163 forming the second pivotal connection. The weight of the entire moving parts however is sustained at all times by the frame 333 as aforesaid. A sleeve 339 positioned about shaft 173 is interposed between bearing 338 and bearing 174, and this constitutes a spacer member for these parts.

The interior of vacuum chamber 26 must be cleaned at intervals to prevent fouling thereof from syrup, brine and foreign particles which often escape from the interior of the can being seamed. For this purpose provision is made for flushing the chamber with water or steam, the upper surface of housing cover 23 being provided with a depressed incline 341, (Figs. 3 and 9) sloping toward a passageway 342 leading to the outside of the casing cover 23 and closed during normal operation of the machine by a pipe plug 343. Water and foreign substances carried thereby thus drains to the low point during this flushing operation and flows through the passageway 342. It will be understood that such a cleaning operation takes place when the machine is not operating and with the door 28 open, this relatively large opening permitting easy access to the interior of the chamber 26. Bearings 113 and 144 of shaft 112 and sleeve 143 extending through the cover 23 into the oil chamber 129 are elevated sufficiently to prevent passage of water into oil chamber 129 beneath.

It is sometimes desirable for the machine manufacturer to know how much a machine has been operated and to provide for a device concealed within the machine that will make some kind of a record of the number of revolutions of some moving part thereof. Machines of the character of the vacuum closing machine of the present invention are often leased to small canners on a rental basis and a record of operations is thus necessary. Such a device is provided in the apparatus disclosed in the drawings and consists of a concealed counter mechanism which is ordinarily not accessible but which will automatically keep a record of the number of turns of the valve shaft 215 and which can be referred to if occasion requires. This counter mechanism (Fig. 11) comprises a worm wheel 345 mounted on shaft 215 and bolted to the gear 214. Worm wheel 345 meshes with a disk 346 having worm teeth cut in its periphery, this disk being a part of a standard counting mechanism indicated generally by the numeral 347, there being some suitable dial 348, (Fig. 1). Mechanism 347 is located within a chamber 349 formed in the valve frame 175. Access to the counting mechanism for the purpose of reading the recorded revolutions of the gear 215 is possible by removal of a cover plate 351 covering chamber 349 and secured by bolts 352.

Air is removed from the vacuum chamber 26 through a pipe line 355 (Fig. 2) one end of which communicates with the interior of the chamber, being bolted to the casing 24 at 356. The other end of the pipe line connects with a usual or preferred form of vacuum source, which may be a vacuum pump or similar device.

A vacuum regulator valve 358 is positioned in the pipe line 355 and limits the degree of rarification of the air within the chamber 26, or in other words prevents the degree of vacuum exceeding a predetermined gauge point. This device acts as a regulator and after chamber 26 has reached its vacuous condition this condition is maintained, the relatively small amount of air admitted with each entering pocket of the valve member and through nozzle 75 being insufficient to affect it.

In the event that the vacuum within chamber 26 falls below a predetermined point or gauge reading, an automatic device which is provided operates to shift the mechanism associated with the clutch connecting the driving pulley 89 and the drive shaft 87 so that these parts will be disconnected and the machine operations cease. Such a control device is illustrated in detail in Figs. 15, 16 and 17.

The principal working parts of this mechanism are carried by a tubular casing 361 mounted upon the upper gear housing 84. Casing 361 encloses the upper end of shaft 173 and the slip clutch mechanism relating to the gear 181 previously described. Casing 361 is surmounted by a cover member 362, which forms the bottom of a chamber 363 enclosed by walls 364 and closed at its upper end by a top plate 365.

A bar 359 is provided for actuation of the drive clutch 91 previously described (Fig. 2), one end of the bar extending to a position adjacent the pivot 101 and the bar at its other end sliding over the upper edge of the casing 361 and beneath the cover 362. Bar 359 at this place (Fig. 15) slides within a slot 366 formed in the cover 362. Bar 359 in one position is adapted to be latched, the bar being moved to this position by engagement with the end of bar 102 (Fig. 2) when the latter is shifted by handle 106 to connect the clutch 91.

Figure 20:
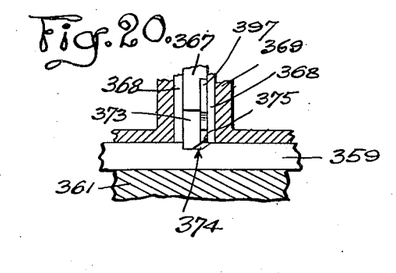
Fig. 20 is a transverse section view taken substantially along the broken line 20—20 in Fig. 17.

This latch device comprises a slide 367 (Fig. 17) operating in guideways 368 formed in a casing 369 mounted on casing 361 and closing one end of chamber 363. During normal operation of the machine, slide 367 is held in lowered or latched position by a spring 371 interposed between the upper end thereof and a cover plate 372 fixed to casing 369. When slide 367 is in this lowered position an extension 373 thereof rests within a slot 374 cut in the upper face of the bar 359 (see also Fig. 16). One end of slot 374 (see also Fig. 20) is inclined and corresponds with an inclined edge 375 formed on the extension 373. This permits sliding of bar 359 in one direction (toward left Fig. 16) which movement is made as just described through handle lever 106.

Such a movement of bar 359 is resisted by a spring 376 resting against a head 377 formed on one end of the bar 359, this end sliding within a block 378 secured to the casing 361. The outer end of spring 376 is held within the end of a cylinder 379 threadedly secured to the block 378.

While the machine is operating, or when it is stopped by manual control of handle lever 106, slide 367 holds its extension 373 in the slot 374. Provision, however, is made in the nature of a control device, for lifting the slide 367 and releasing the bar 359 which when freed from the latch moves under action of spring 376 to strike against bar 102 and by moving it to disconnect clutch 91 and stop the machine. This control device is actuated in three different ways, first by reduction of vacuum within chamber 26 below a certain point, second by a mechanical connection with the slip clutch of gear 181, and third by admission of air to certain parts of the device. The first and second actuations are automatic, the third is at the will of the operator. These will now be described.

Chamber 26 is in communication with a line of pipe 381, one end of which is screwed into the casing cover 25 (Fig. 1), and the opposite end is threadedly secured to a cylinder head 382 fixed in one end of a cylinder 383 connected to the casing 361 (Fig. 15), cylinder 383 enclosing a chamber 384 having an end wall 385. Cylinder 383 extends forwardly beyond wall 385 and connects with side walls 364, these connecting parts providing the chamber 363 previously described.

A passageway 386 is formed in cylinder head 382 and connects the interior of pipe 381 with the interior of a sylphon bellows 387 attached to the head 382 and positioned within the chamber 384. The interior of bellows 387 is thus in communication with the interior of the chamber 26 and the same air pressure or absence of air pressure prevails in both places. Bellows 387 is very sensitive to a change in air pressure and immediately responds to the slightest change of pressure within the chamber 26.

The closed end of bellows 387 is connected with a plate 388 having a stem 389 passing through an opening formed in the wall 385. Stem 389 is connected with a horizontal rod 391 which carries a collar 392 adjustably positioned thereon, the collar being held longitudinally of the rod by an adjusting nut 390 threadedly connected therewith said collar confining a spring 393 between it and the wall 385. Rod 391 and spring 393 are positioned within chamber 363, the former being connected to a bell crank lever 394 pivoted on a fixed shaft 395 carried by the side walls 364.

Bell crank lever 394 is loosely connected at 396 to an arm 397 pivoted on a pin 398 carried by the slide 367. Arm 397 carries an extension hook 399 adapted to be moved into the path of travel of a vertically sliding rod 401 moving within a bore 402 formed in casing 361.

Rod 401 is raised and lowered by a cam, the rod carrying at its lower extremity a block 403 on which is rotatably mounted a cam roller 404 which operates within a cam groove 405 formed in the collar 194. The upper end of rod 401 is provided with a notch 406 which engages and seats the hook 399 of the arm 397 when the former is in the proper position.

Chamber 384 (Fig. 15) is at all times under atmospheric pressure and the spring 393 is of proper adjusted strength to balance the difference between this atmospheric pressure operating against the end of bellows 387 and the rarefied air pressure or vacuum on the interior thereof. This balanced position is illustrated in Fig. 15, hook 399 of arm 397 being swung to one side and out of the path of travel of the rod 401 at such time. Rod 401 is lifted with each rotation of the shaft 173 but as long as the proper degree of vacuum exists within the chamber 26 and the balance is maintained this lifting of rod 401 is without effect.

When the vacuum within chamber 26 is reduced, or otherwise stated when the actual pressure is increased, the balance between interior and exterior of the bellows 387 is disturbed such action then moving rod 391 toward the right, shifting bell crank lever 394, lifting arm 397 and moving its hook extension into the path of travel of the rising rod 401. Upon engagement between notch 406 and hook 399 further lifting of rod 401 raises the entire slide 367 and parts carried thereby against the action of the spring 371.

Extension 373 is thereupon carried out of groove 374 of bar 359 and spring 376 then slides the bar which throws the clutch mechanism out of engagement stopping the machine. This constitutes the first automatic action of the control device.

For the second actuation, which takes place when gear 181 is held, there is provided a second vertical rod 407 sliding within a bore 408 formed in casing 361, the upper end of the rod engaging slide 367 (Figs. 16 and 17). The lower end of rod 407 carries a pin 409 which projects over the upper shoulder of the collar member 194. Upon operation of the collar 194 against the action of spring 196 rod 407 is correspondingly lifted to raise slide 367 and disengage its extension 373 from the bar 359 in a manner identical with that just described. This prevents damage to the machine which might otherwise result if it continued to run after slipping of the gear clutch members.

A simple way of stopping the machine when the operator so desires is by admission of air to the interior of bellows 387. A pipe T 411 (Figs. 1 and 15) is interposed within the pipe line 381 near cylinder 383, a pipe 412 being connected to one branch of the T, and a standard finger controlled valve 413 being positioned in a convenient location on said pipe 412. Upon depression of its button 414 air passes into pipe 412, T 411, pipe 381, passageway 386 and into the interior of the sylphon bellows 387 thus disturbing the balance and lifting the slide 367 to free the bar 359, which slides as previously described to disconnect the driving and driven elements.

A vacuum gauge 415 is secured to the casing 24 (Figs. 1 and 3) and this gives a visual indication of the condition of vacuum within chamber 26.

It is thought that the invention and many of its attendant advantages will be understood from the foregoing description and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. In an apparatus for vacuumizing and sealing containers, the combination of a casing providing a vacuum chamber and having an opening communicating with said chamber, conveying mechanism adjacent said chamber for delivering cans thereto including a valve having a plurality of can receiving pockets, a feeding device for untimed cans, a transfer device for moving a can from the feeding device to a pocket of said valve and timing mechanism for individually timing and presenting each can to the transfer device, a clutch through which the said mechanism is operated, and means controlled by the degree of vacuum in said vacuum chamber for disconnecting said clutch.

2. In an apparatus for vacuumizing and sealing containers, the combination of a casing providing a vacuum chamber, seaming mechanism arranged in said chamber, conveying mechanism adjacent said chamber for delivering cans thereto, including a valve having a plurality of can receiving pockets, a frame in which said valve is mounted, said frame having movable association with the casing whereby the valve surface may be moved out of and into operating contact with the surface of said chamber.

3. In an apparatus for vacuumizing and sealing containers, the combination of a casing providing a vacuum chamber, seaming mechanism arranged in said chamber, conveying mechanism adjacent said chamber for delivering cans thereto, including a valve having a plurality of can receiving pockets and having a rotary bearing against said chamber, a shaft carried by said casing, and a frame pivoted on the shaft and carrying said valve.

4. In an apparatus for vacuumizing and sealing containers, the combination of a casing providing a vacuum chamber, seaming mechanism arranged in said chamber, conveying mechanism adjacent said chamber for delivering cans thereto, including a valve having a plurality of can receiving pockets and having a rotary bearing against said chamber, a shaft carried by said casing, a frame pivoted on the shaft and carrying said valve, and means for locking said frame and valve in valve operating position.

5. In an apparatus for vacuumizing and sealing containers, the combination of a casing providing a seaming chamber, having an opening communicating with said chamber, seaming mechanism arranged in said chamber, a frame pivotally connected with said casing, conveying mechanism adjacent said chamber for delivering cans thereto including a valve having a plurality of can receiving pockets and carried by said frame, feeding and transferring devices carried by said frame for delivering cans to said can receiving pockets, said frame being movable about its pivotal connection for presentation of said valve to and against the casing opening in one position and for removal of the same out of contact with and away from said opening in its other positions.

6. In an apparatus for vacuumizing and sealing containers, the combination of a vacuum chamber adapted to be brought under a predetermined vacuum, seaming mechanism arranged within said chamber, conveying mechanism for presenting cans to the seaming mechanism, actuating mechanisms for operating the seaming and conveying mechanisms, and control devices, including a bellows having its interior in communication with the interior of the vacuum chamber for terminating the operation of the actuating mechanisms upon reduction of the predetermined vacuum within said vacuum chamber.

7. In an apparatus for vacuumizing and sealing containers, the combination of a vacuum chamber adapted to contain a rarefied atmosphere, seaming mechanism arranged within said chamber, conveying mechanism for presenting cans to the seaming mechanism, actuating mechanisms for operating the seaming and conveying mechanisms, automatic control devices operable by a change in said rarefied atmosphere for rendering inoperative the said actuating mechanisms, and means for manually operating said automatic control devices.

8. In an apparatus for vacuumizing and sealing containers, the combination of a vacuum chamber adapted to contain a rarefied atmosphere, seaming mechanism arranged within said chamber, conveying mechanism for presenting cans to the seaming mechanism, actuating mechanisms for operating the seaming and conveying mechanisms, automatic control devices, including a bellows having its interior in communication with the interior of the vacuum chamber and operating upon reduction of the predetermined vacuum within said vacuum chamber and said bellows to terminate the operation of the actuating mechanisms, and means for manually reducing the vacuum within said bellows in order to effect such termination.

9. An apparatus for vacuumizing and sealing containers, in combination, a vacuum chamber, seaming mechanism including a rotating seaming head arranged in said chamber, and means introducing air into said chamber and in controlled amounts for cooling said head by its expansion.

10. An apparatus for vacuumizing and sealing containers, in combination, a vacuum chamber, seaming mechanism including a rotating seaming head arranged in said chamber, a stationary air nozzle mounted within said vacuum chamber adjacent said rotating seaming head, and a connecting member forming communication between said nozzle and a source of air supply whereby a given quantity of air is introduced within the vacuum chamber and directed against the rotating seaming head.

11. An apparatus for vacuumizing and sealing containers, in combination, a vacuum chamber, seaming mechanism comprising a rotating seaming head and relatively stationary supporting frame parts arranged in said chamber, and means comprising devices for circulating a cooling fluid through parts of said stationary frame for dissipating frictional heat generated by the rotating seaming head about its stationary supporting frame.

12. In an apparatus for vacuumizing and sealing containers, the combination of a vacuum chamber, seaming mechanism in said chamber, conveying mechanism adjacent said chamber for delivering cans thereto including a valve having a plurality of can receiving pockets, a frame in which said valve operates, and a recording counting mechanism concealed within said frame and connecting with said valve for recording the operations thereof.

13. An apparatus for closing containers and the like, comprising, seaming mechanism, a casing providing an air tight chamber about said seaming mechanism, mechanism adjacent said chamber for conveying cans, with their covers loosely applied, to and from the casing including a valve having a plurality of can receiving pockets, and fingers mounted in said pockets adapted to engage both cans and covers and to eject the same from their pockets within said valve and into said chamber.

14. In an apparatus for vacuumizing and sealing containers, the combination of a vacuum chamber adapted to contain a rarefied atmosphere, seaming mechanism arranged in said chamber, conveying mechanism for delivering cans with covers loosely applied to the seaming mechanism within said chamber, and means, operating while the interior of the can is in communication with said rarefied atmosphere of the chamber, for maintaining an air passageway between said can and cover.

15. In an apparatus for vacuumizing and sealing containers, the combination of a vacuum chamber adapted to contain a rarefied atmosphere, seaming mechanism arranged in said chamber, conveying mechanism for delivering cans with covers loosely clinched thereon to the seaming mechanism within said chamber, and a cover retaining plate arranged in said vacuum chamber and above the path of travel of the can and cover within said rarefied atmosphere for spacing said clinched cover away from the can and maintaining an air passageway therebetween.

16. In an apparatus for vacuumizing and sealing containers, the combination of a casing providing a vacuum chamber, and having an opening communicating with said chamber, a valve having a plurality of can receiving pockets positioned in said opening for delivering cans into said vacuum chamber, and a cleaning device mounted adjacent to and frictionally engaging said valve.

17. In an apparatus for vacuumizing and sealing containers, the combination of a casing providing a vacuum chamber and having an opening communicating with said chamber, a valve having a plurality of can receiving pockets positioned in said opening for delivering cans into said vacuum chamber, and an oiling device mounted adjacent to and frictionally engaging said valve.

18. In an apparatus for vacuumizing and sealing containers, the combination of a casing enclosing a vacuum chamber and having an opening communicating with said chamber, a valve having a plurality of can receiving pockets positioned in said opening for delivering cans into said vacuum chamber, and a cleaning and oiling device hingedly mounted adjacent said valve and comprising a cleaning scraper and an oiling wick yieldingly held in frictional engagement with said valve.

19. In an apparatus for vacuumizing and sealing containers, the combination of a casing providing a vacuum chamber, seaming mechanism arranged in said chamber, a gear and moving parts housing below said chamber, gear and moving parts in said housing, and an oil bath in which said gear and moving parts are immersed.

20. In an apparatus for vacuumizing and sealing containers, the combination of a casing providing a vacuum chamber, seaming mechanism arranged in said chamber, a gear and moving parts housing below said chamber, gear and moving parts in said housing, an oil bath in which said gear and moving parts are immersed, and means establishing the vacuum pressure of said chamber on said oil bath.

21. In an apparatus for vacuumizing and sealing containers, the combination of a seaming head, can moving devices for moving cans to and from said seaming head, a casing providing a vacuum chamber surrounding the seaming head and the can moving devices, actuating mechanisms for operating the seaming head, and the can moving devices comprising a drive shaft, a set of instrumentalities extending through the upper part of said casing for transmitting motion from said shaft to said seaming head, a second set of instrumentalities extending through the lower part of said casing for transmitting motion to the can moving devices, and means for maintaining a vacuum within the vacuum chamber while permitting relative movement between the casing on the one hand and the instrumentalities on the other.

22. In an apparatus for vacuumizing and sealing containers, the combination of a vacuum chamber adapted to contain a rarefied atmosphere, seaming mechanism arranged within said chamber, conveying mechanism for presenting cans to the seaming mechanism, actuating mechanisms for operating the seaming and conveying mechanisms, control devices for rendering inoperative the said actuating mechanisms, automatic means for operating said control devices, said means being operable by a change in the rarefied atmosphere within the vacuum chamber, and by an abnormal condition in the conveying mechanism, and means for manually operating said control devices.

23. In an apparatus for vacuumizing and sealing containers, the combination of a vacuum chamber adapted to contain a rarefied atmosphere, seaming mechanism arranged within said chamber, conveying mechanism for presenting cans to the seaming mechanism, actuating mechanisms for operating the seaming and conveying mechanisms, automatic control devices, including a bellows having its interior in communication with the interior of the vacuum chamber and operating upon reduction of the predetermined vacuum within said vacuum chamber and said bellows to terminate the operation of the actuating mechanisms, means for terminating the operation of the actuating mechanisms independent of said bellows, and means for manually reducing the vacuum within said bellows in order to effect termination by said bellows.

RONALD E. J. NORDQUIST.